Dec. 19, 1961

R. T. MARETTE 3,013,534

PLURAL POSITION ACTUATOR

Filed Dec. 21, 1960

INVENTOR.
RALPH T. MARETTE

BY
RICHEY, McNENNY & FARRINGTON

Donald W. Farrington
ATTORNEYS

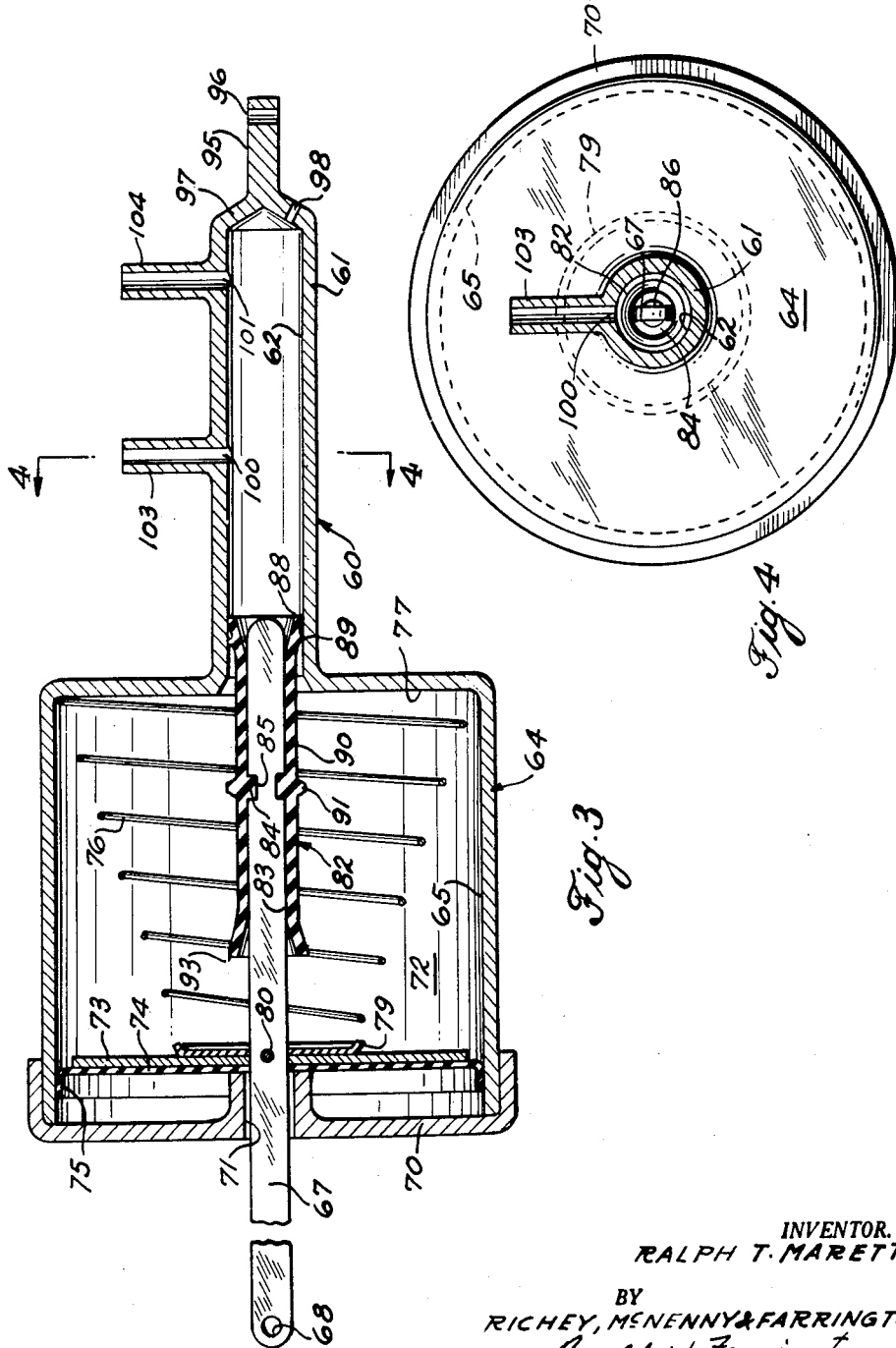

United States Patent Office 3,013,534
Patented Dec. 19, 1961

3,013,534
PLURAL POSITION ACTUATOR
Ralph T. Marette, Cleveland Heights, Ohio, assignor to The Weatherhead Company, Cleveland, Ohio, a corporation of Ohio
Filed Dec. 21, 1960, Ser. No. 77,365
13 Claims. (Cl. 121—41)

This invention relates to fluid operated actuators and more particularly to a vacuum powered actuator adapted to selectively move a device between several different preselected positions.

The principal object of this invention is to provide a vacuum operated actuator adapted to shift an object between a plurality of selected positions responsive to selective connection of the vacuum power source to the actuator.

Another object of this invention is to provide a vacuum operated actuator in accordance with the foregoing object which has a fast response to the selected position and is stable at the selected position without oscillation or hunting about that position.

Another object of this invention is to provide a vacuum operated actuator in which the valving to control position of the actuator is separate from the actuator motor and is shifted directly by the motor to selectively close off ports connected to the vacuum source.

Another object of this invention is to provide a vacuum operated actuator in which the selector valve is a spool or seal member which is shiftable along a bore between positions partially blocking off a selected one of a plurality of ports connected to the vacuum source to maintain a balance of fluid flow between a bleed passage opening into the bore and the port connected to the vacuum source.

Still another object of this invention is to provide a vacuum operated actuator as set forth in the preceding object in which the control valve is insensitive to vacuum applied to other position selecting ports on one direction from the selected position port.

Yet another object of this invention is to provide a vacuum powered actuator in accordance with the preceding objects which is simple in construction with a minimum number of component parts and is relatively inexpensive to manufacture without sacrifice of reliability of operation.

Further objects and advantages relating to the construction and operation of the actuator of this invention will readily appear from the following description of the preferred embodiments of the invention as shown in the drawings in which:

FIG. 3 is a longitudinal cross-sectional view of another embodiment of the actuator of this invention; and FIG. 4 is a cross-sectional view taken on line 4—4 of FIG. 3.

Figure 1:
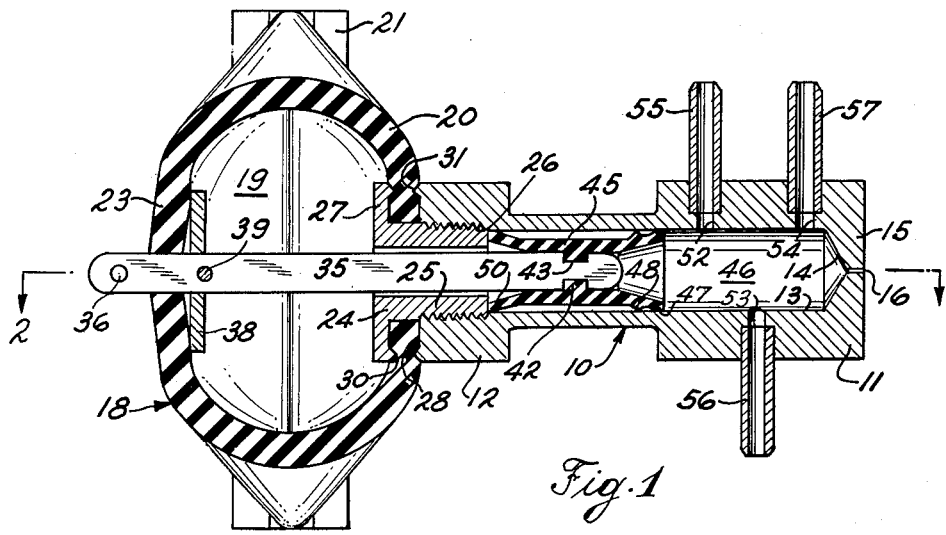
FIG. 1 is a longitudinal cross-sectional view through the actuator.
Figure 2:
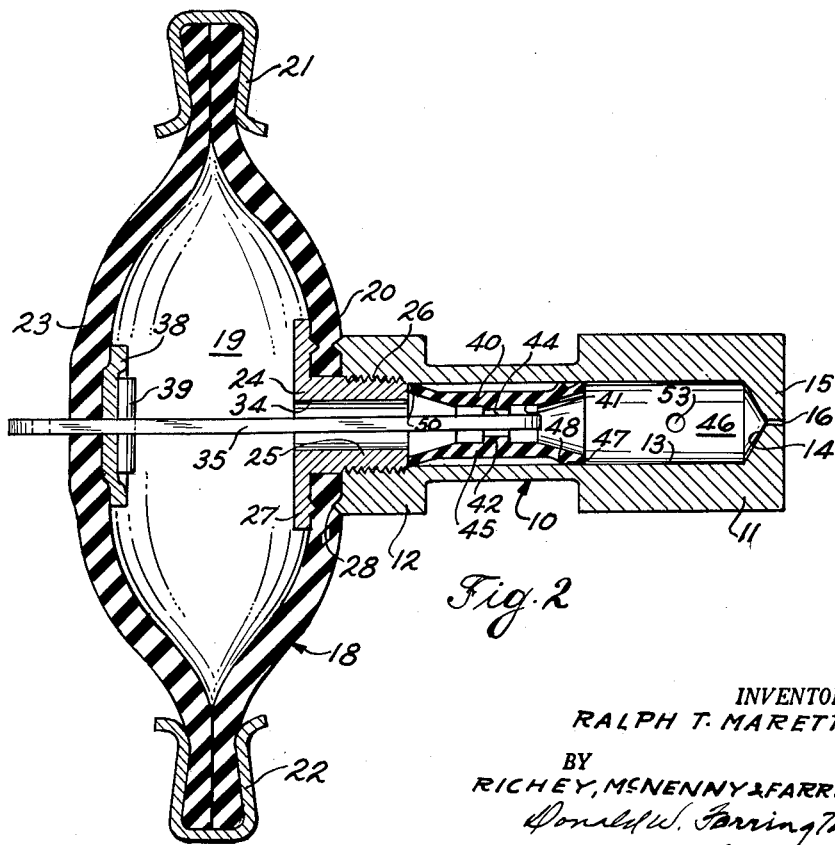
FIG. 2 is a cross-sectional view taken on line 2—2 of FIG. 1.

Referring now in greater detail to the embodiment shown in FIGS. 1 and 2, the actuator shown therein employs a vacuum powered actuator motor of the type disclosed in the co-pending application by the same inventor, Serial No. 829,718, filed July 27, 1959. This actuator finds particular use in automobiles in positioning valves and dampers used in the heating and defrosting system.

The actuator has a valve body member 10 which is roughly cylindrical in shape with enlarged ends 11 and 12. An axial bore 13 extends through the valve body 10 from the enlarged end 12 and terminates within the opposite enlarged end 11 in a conical end portion 14 cut by the drill point used in forming the bore 13. A small diameter bleed passage 16 passes outwardly through the end wall 15 of the valve body 10 from the point of the conical end portion 14. This bleed passage 16 is of a size to allow a rate of flow of atmospheric air into the bore 13 which is substantially less than the rate at which the vacuum source can evacuate air from the motor chamber as described in greater detail hereinafter.

An expansible chamber fluid motor in the form of bellows 18 is secured to the valve body 10 adjacent the end 12. Bellows 18 is shown as formed from a piece of flexible rubber hose in accordance with the co-pending application referred to hereinabove. The hose is resiliently flexible and the ends are squeezed together and closed off by means of clamps 21 and 22 to define a chamber 19 within the bellows. The bellows 18 is fastened to valve body 10 by means of a plug 24 which passes through an opening in the side wall portion 20 of the bellows adjacent the valve body 10. A threaded shank 25 on plug 24 engages a threaded counterbore 26 within the valve body 10 to secure these members together. Plug 24 has a radially extending flange 27 on the inner side of bellows wall 20 within chamber 19 opposite the end face 28 of valve body 10. Flange 27 and end face 28 are each provided with annular ridges 30 and 31, respectively, which bite into the hose wall to firmly hold the bellows 18 in position on the valve body 10 as the plug 24 is threaded tightly into the counterbore 26. An axial bore 34 is provided within plug 24 to allow the actuator rod 35 to pass freely therethrough. The actuator rod 35 is formed from a flattened rod or strip of metal and extends outwardly through the outer wall 23 of bellows 18 where it is provided with a suitable hole or eyelet 36 for connection to the device to be moved. The outer end of actuator rod 35 is secured to the bellows wall 23 with a suitable adhesive or cement, and to prevent stress concentrations in the side wall 23, a thrust plate 38 is attached to the actuator rod on the inner side of bellows wall 23 and held in place by a pin 39. Thus when the bellows tends to collapse due to reduction of air pressure within the chamber 19, the force exerted by the bellows walls will be absorbed by the thrust plate 38 and transferred to the actuator rod 35 by the pin 39 to prevent loosening of the cemented joint between the bellows and the actuator rod.

A valve spool or sealing member 40 formed of a resilient material such as rubber is mounted on the other end of actuator rod 35 within the bore 13 to define a chamber portion 46 in bore 13. Spool 40 has an axial bore 41 extending from end to end therethrough, and is secured to the actuator rod by means of internal annular rib 42 adjacent the mid-point of bore 41. Rib 42 fits into a notched section 43 on the end of the actuator rod and by virtue of the flattened shape of the actuator rod 35, fluid passages 44 extend past the annular rib 42 on each side of the actuator rod, as shown more clearly in FIG. 2. The mid-section 45 of the valve spool 40 is spaced away from the walls of bore 13 to reduce any sliding friction between the valve spool and the bore. At the outer end, spool 40 is provided with a flared lip 47 adapted to make sealing contact with the walls of bore 13. A spaced distance behind the flared lip 47 is an annular rib 48 extending circumferentially around the valve spool to make sealing contact with the bore walls. The other end of the valve spool 40 is flared outwardly to form a second lip 50 also adapted to make sealing contact with the walls of bore 13.

At spaced distances along the portion of bore 13 within the enlarged end section 13, a plurality of ports 52, 53 and 54 extend radially outward from the bore. These ports connect to fittings 55, 56 and 57, respectively, to make connection to a suitable vacuum line. The ports 52, 53 and 54 are of smaller diameter than the spacing between the lip 47 and rib 48 on valve spool 40 but substantially larger than the bleed passage 16. For example, a port diameter of 1/16" will give fairly rapid response for the motor, and the bleed passage would then be 15 to 25% of the port diameter or .010–.015". It will be understood that the fittings 55, 56 and 57 are connected to a suitable selector valve for selective connection to a source of vacuum which, when the actuator is used in an automobile, may be the intake manifold of the automobile engine. The selector valve, vacuum source and connecting lines between the valve and the fitting have not been shown and will not be described further since they form no part of the present invention.

When all of the ports 52, 53 and 54 are disconnected from the vacuum source, air enters freely through the bleed passage 16 through bore 13, passage 44 within the valve spool 40, and bore 34 into the chamber 19 within bellows 18. Since the bellows 18 is formed from resilient material, the center section intermediate the clamps 21 and 22 where the actuator rod 35 is connected will tend to assume a circular shape so that the side walls 23 and 20 are spaced apart. As a result, the actuator assumes an extended position with the valve spool 40 in the position shown in FIGS. 1 and 2 with the lip 50 in abutting contact with the inner end of plug 24.

When vacuum is connected to port 52, leaving ports 53 and 54 blocked off, the air is withdrawn from within the bellows chamber 19 so that the force of the external atmosphere causes the side walls 20 and 23 to move together and reduce the volume of chamber 19. Movement of side wall 23 forces the actuator rod 35 and hence valve spool 40 toward the end wall 15 of bore 13 until the lip 47 passes across port 52. Since atmospheric air can enter through the restricted bleed passage 16 only at a rate substantially less than the rate at which it is withdrawn by the vacuum source, the leakage of air through this bleed passage does not noticeably affect the operation of the actuator motor. The valve spool 40 will continue to move until the port 52 is partially blocked and will remain stationary in this position with a pressure balance equilibrium between the net flow of air inwardly through the bleed passage 16 and the net flow of air outwardly through the partially blocked port 52. In this position there is no flow of air into or out of the bellows chamber 19, and the actuator will therefore remain stable in this position so long as the vacuum source remains connected. Fluctuations in the pressure of the vacuum source will not produce any substantial change in the position of the actuator, since the valve spool will be shifted automatically to change the effective area of the vacuum port until equilibrium is restored.

If the vacuum is now applied to the adjacent port 53 while maintaining the third port 54 blocked, the actuator rod 35 and valve spool 40 will now be shifted closer toward the end wall 15 of the bore until the lip 47 partially obstructs port 53 to obtain a flow balance between the bleed passage 16 and effective area of port 53. When the actuator is in this position, it does not matter whether the first port 52 is obstructed, connected to a vacuum source, or left open to the atmosphere. Port 52 now opens into the space around the mid-section 45 of valve spool 40, and this space is closed off at one end by the annular rib 48 which closes off bore 13 in the space between the ports 52 and 53 at the other end by the lip 50. Since the space surrounding the reduced mid-section 45 of the spool is not connected to any of the other ports or to the chamber 19, vacuum connection to this port cannot affect the operation of the actuator.

Likewise, if vacuum is applied to the third port 54, the spool and actuator rod will move downwardly until lip 47 partially blocks port 54 to obtain fluid balance in the aforedescribed manner. Since rib 48 seals off port 54 from either of the ports 52 and 53, and since the lip 50 at the opposite end of the valve spool 40 seals off the space around mid-section 45 where ports 52 and 53 are connected from the remainder of bore 13, the ports 52 and 53 may be connected to either vacuum or the atmosphere without affecting the operation of the actuator.

From the above described description of the operation of the actuator, it will be seen that the actuator can assume any one of four positions, depending upon whether none of the ports is connected to vacuum, or whether one of the ports 52, 53 and 54 is connected to the vacuum source. The ports are made of such a size that the vacuum source can quickly exhaust the air contained within chamber 19 so that the valve spool 40 moves quickly to partially block the port. If the inertia of the valve spool should cause it to overshoot the port connected to vacuum, the fluid flow outwardly through this port will be stopped or reduced and the air entering in through the restricted bleed passage 16 will refill the chamber 19 and cause the bellows to expand until the lip 47 partially blocks the vacuum port to obtain the necessary restriction and port size to balance the air flow inwardly through the bleed passage 16. If the vacuum source is disconnected from the port which has been selected to position the actuator, air will flow inwardly through bleed passage 16 to fill the chamber 19, and the resiliency of the bellows 18 will withdraw the actuator rod 35 and valve spool 40 back into the extended position as shown in FIGS. 1 and 2.

Another embodiment of the invention employing a piston type motor is shown in FIGS. 3 and 4. As shown therein, the actuator has a body 60 comprising a reduced shank portion 61 having an axial bore 62 extending partially therethrough. At the one end, shank portion 61 is connected to an enlarged cylinder portion 64 having a bore 65 therethrough connected to and coaxial with the bore 62. An actuator rod 67 having a flattened cross-section is mounted within the bores 62 and 65 and extends outwardly through a bore 71 in the end cap 70 which covers the outer end of cylinder portion 64. This projecting end of the actuator rod 67 is provided with a hole or eyelet 68 for connection to the device to be moved.

A piston in the form of a plate 73 is positioned within the cylinder bore 65 around the actuator rod 67 and defines a vacuum chamber 72 on the side of piston 73 adjacent shank portion 61. A seal member 74 is positioned adjacent the piston 73 on the side toward the cap 70 and extends across the cylinder bore 65 from wall to wall to make sealing contact with the walls along the flange or lip portion 75. A conical coil compression spring 76 is fitted within the vacuum chamber 72 to bear at the one end against the end wall 77 of the vacuum chamber and at the other end against a washer 79 surrounding actuator rod 67 adjacent the piston or plate 73. A pin 80 extends transversely through actuator rod 67 between plate 73 and washer 79 to transmit the forces applied to plate 73 and washer 79 to the actuator rod.

A valve spool 82 of a suitable resilient material such as rubber, is fitted within the bore 62 in shank portion 61. Valve spool 82 has an axial bore 83 passing therethrough, and bore 83 is provided with an inwardly projecting annular rib 84 at its mid-portion which fits into a notched portion 85 on the end of actuator rod 67 to secure the valve spool to the actuator rod. Since the actuator rod 67 has a flattened cross-sectional shape, fluid passages 86 are left around the annular rib 84 adjacent each of the flattened sides of the actuator rod. At the end of valve spool 82 away from the cylinder portion 64 the valve spool is flared outwardly to form a lip 88 adapted to make sealing contact with the walls of bore 62. An annular sealing rib 89 extends circumferentially around the valve spool a spaced distance behind the lip 88. The mid-portion 90 of valve spool 82 is reduced in diameter to reduce sliding friction between the valve spool and bore 62, and an annular sealing rib 91 extends radially outwardly on the mid-portion 90 intermediate the ends to make sealing contact with the walls of bore 62. At the other end, valve spool 82 is provided with a second flared lip 93 also adapted to make sealing contact with the walls of bore 62 when the valve spool 82 is positioned fully within the bore.

The end of shank portion 61 of body 60 away from the cylinder portion 64 is provided with a projecting lug 95 through which extends a transverse hole or eyelet 96 for connecting the other end of the actuator to a stationary point. Thus, operation of the actuator changes the distance between the hole 96 in lug 95 and the hole 68 in the end of actuator rod 67 to shift a movable member such as a valve or the like. A restricted bleed passage 98 extends through the end wall 97 of shank portion 61 to connect the bore 62 to the external atmosphere. A pair of ports 100 and 101 open into bore 62 at spaced points along its axis and are connected to suitable fittings 103 and 104. These fittings are connected through a selector valve to a suitable vacuum source in the manner described hereinabove in conjunction with the embodiment of FIGS. 1 and 2.

The actuator of this embodiment functions in substantially the same manner as that of the embodiment of FIGS. 1 and 2. When a vacuum is applied to port 100 through the fitting 103, the fluid within the chamber 72 in cylinder portion 64 is exhausted through the bore 83 and fluid passages 86 in the valve spool 82, bore 62 and the port 100. As the pressure within chamber 72 drops, the external atmosphere entering through the space around the actuator rod 67 in bore 71 in cap 70 exerts a force upon the seal 74 and piston or plate 73 to shift the actuator rod 67 toward end wall 77. The compression spring 76 is sufficiently light that it is easily compressed by this force and provides no appreciable resistance to the movement of the actuator. When the lip 88 on valve spool 82 partially obstructs the port 100 to obtain a balance of fluid flow between the air entering through the bleed passage 98 and that passing outwardly to the vacuum source through the effective area of port 100, the actuator will remain in equilibrium in this position. If the actuator should respond too rapidly and overshoot the port 100, the vacuum source connected at port 100 will not be connected to the cylinder chamber 72, since the bore 62 is blocked off by the rib 89 adjacent the flared lip 88, and if rib 89 should overshoot the port, the bore is still blocked off by the annular sealing rib 91 on the mid-portion 90 of the valve spool. If such an overshoot should occur, the air entering through the restricted bleed passage 98 will refill the chamber 72 so that compression spring 76 is able to move the actuator rod back until the port 100 is only partially obstructed.

In like manner, the application of vacuum to the other port 101 will cause the actuator rod 67 and valve spool 82 to move toward end wall 97 until the lip 88 partially obstructs the port to obtain the proper balance of fluid flow. In this position, the other port 100 may be connected either to vacuum or to the atmosphere, since it is blocked off from chamber 72 at each side by the sealing rib 91 on the mid-portion of the valve spool and by the flared lip 93 at the opposite end of the spool.

It will be seen therefore, that the actuator described above provides three positions for the actuator rod 67 depending whether none of the ports is connected to vacuum, or whether port 100 or port 101 is connected to the vacuum source. When the vacuum source is disconnected from both ports, air entering either through the ports 100 and 101 or throught the bleed passage 98 will refill the chamber 72 so that the biasing force of compression spring 76 exerted on the actuator rod 67 moves the actuator rod back to the position shown in FIG. 3.

Although several embodiments of the invention have been shown and described in detail, it will be understood by those skilled in the art that the invention is not limited to these specific embodiments and various modifications may be made therein without departing from the scope of the invention as defined in the appended claims.

What is claimed is:

1. An actuator comprising a vacuum motor, a valve body, said valve body having an axial bore therein, said bore being closed at one end, a valve member slidable in said bore, said valve member making sealing contact with the walls of said bore to define a chamber therein, means connecting said valve member to said motor to be shifted thereby, passage means connecting said chamber to said motor, a plurality of ports opening into said chamber at spaced distances along said bore, and a bleed passage connecting said chamber to the atmosphere.

2. An actuator comprising a vacuum motor, a valve body secured to said motor, said valve body having an axial bore therein, said bore being closed at one end, a valve member slidable in said bore, said valve member making sealing contact with the walls of said bore to define a chamber therein, means connecting said valve member to said motor to be shifted thereby, passage means extending through said valve member connecting said chamber to said motor, a plurality of ports opening into said chamber at spaced distances along said bore, and a bleed passage connecting said chamber to the atmosphere, said bleed passage having an effective area smaller than that of any of said ports.

3. An actuator comprising a vacuum motor, a valve body, said valve body having an axial bore therein, said bore being closed at one end, a valve member slidable in said bore, said valve member making sealing contact with the walls of said bore to define a chamber therein, means connecting said valve member to said motor to be shifted thereby, means biasing said valve member away from said closed end of said chamber, passage means connecting said chamber to said motor, a plurality of ports opening into said chamber at spaced distances along said bore, and a bleed passage connecting said chamber to the atmosphere.

4. An actuator comprising a vacuum motor, a valve body, said valve body having an axial bore therein, said bore being closed at one end, a resilient valve spool slidable in said bore, said valve spool having a lip portion on the end thereof adjacent said closed end to make sealing contact with the walls of said bore to define a chamber therein, said valve spool having a lip at the end opposite said first lip to make sealing contact with said bore, the portion of said valve spool intermediate the ends being spaced away from the walls of said bore, means connecting said valve spool to said motor to be shifted thereby, passage means connecting said chamber to said motor, a plurality of ports opening into said chamber at spaced distances along said bore, and a bleed passage connecting said chamber to the atmosphere.

5. An actuator comprising a vacuum motor, a valve body secured to said motor, said valve body having an axial bore therein, said bore being closed at one end, a resilient valve spool slidable in said bore, said valve spool having a lip portion on the end thereof adjacent said closed end to make sealing contact with the walls of said bore to define a chamber therein, said valve spool having a lip at the end opposite said first lip to make sealing contact with said bore, the portion of said valve spool intermediate the ends being spaced away from the walls of said bore, an actuator rod connecting said valve spool to said motor to be shifted thereby, a passage extending through said valve spool connecting said chamber to said motor, a plurality of ports opening into said chamber at spaced distances along said bore, and a bleed passage connecting said chamber to the atmosphere.

6. An actuator comprising a vacuum motor, a valve body, said valve body having an axial bore therein, said bore being closed at one end, a resilient valve spool slidable in said bore, said valve spool having a flared lip at one end adjacent said closed end of said bore and adapted to make sealing contact with the walls of said bore to define a chamber therein, a lip on the end of said valve spool opposite said first lip to make sealing contact with said bore, a circumferential rib on said valve spool a spaced distance from said first lip to make sealing contact with said bore, the portion of said valve spool intermediate the ends being spaced away from the walls of said bore, means connecting said valve spool to said motor to be shifted thereby, passage means connecting said chamber to said motor, a plurality of ports opening into said chamber at spaced distances along said bore, the axial length of each of said port openings being less than the spacing between said first lip and said rib on said valve spool, and a bleed passage connecting said chamber to the atmosphere.

7. An actuator comprising a vacuum motor, a valve body secured to said motor, said valve body having an axial bore therein, said bore being closed at one end, a resilient valve spool slidable in said bore, said valve spool having a flared lip at one end adjacent said closed end of said bore and adapted to make sealing contact with the walls of said bore to define a chamber therein, a lip on the end of said valve spool opposite said first lip to make sealing contact with said bore, a circumferential rib on said valve spool a spaced distance from said first lip to make sealing contact with said bore, the portion of said valve spool intermediate the ends being spaced away from the walls of said bore, an actuator rod connecting said valve spool to said motor to be shifted thereby, a passage extending through said valve spool connecting said chamber to said motor, a plurality of ports opening into said chamber at spaced distances along said bore, the axial length of each of said port openings being less than the spacing between said first lip and said rib on said valve spool, and a bleed passage connecting said chamber to the atmosphere.

8. An actuator comprising a tube of resilient material, means at each end of the tube holding the opposite sides of the tube flattened toward one another and closing the respective end of the tube, the opposite sides of the tube being bowed away from each other between the ends of the tube, a valve body secured to one side of the tube, said valve body having an axial bore therein opening into the interior of said tube, said bore being closed at the other end, a valve member slidable in said bore, said valve member making sealing contact with the walls of said bore to define a chamber between said valve member and said closed end, means connecting said valve member to the other side of said tube, passage means connecting said chamber to the interior of said tube, a plurality of ports opening into said chamber at spaced distances along said bore, and a bleed passage connecting said chamber to the atmosphere.

9. An actuator comprising a tube of resilient material, means at each end of the tube holding the opposite sides of the tube flattened toward one another and closing the respective end of the tube, the opposite sides of the tube being bowed away from each other between the ends of the tube, a valve body secured to one side of said tube, said valve body having an axial bore therein opening into the interior of said tube, said bore being closed at the other end, a resilient valve spool slidable in said bore, said valve spool having a lip portion on the end thereof adjacent said closed end to make sealing contact with the walls of said bore to define a chamber therein, said valve spool having a lip at the end opposite said first lip to make sealing contact with said bore, the portion of said valve spool intermediate the ends being spaced away from the walls of said bore, means connecting said valve spool to the other wall of said tube, passage means connecting said chamber to the interior of said tube, a plurality of ports opening into said chamber at spaced distances along said bore, and a bleed passage connecting said chamber to the atmosphere.

10. An actuator comprising a tube of resilient material, means at each end of the tube holding the opposite sides of the tube flattened toward one another and closing the respective end of the tube, the opposite sides of the tube being bowed away from each other between the ends of the tube, a valve body secured to one side of said tube, said valve body having an axial bore therein opening into the interior of said tube, said bore being closed at the other end, a resilient valve spool slidable in said bore, said valve spool having a flared lip at one end adjacent said closed end of said bore and adapted to make sealing contact with the walls of said bore to define a chamber therein, a lip on the end of said valve spool opposite said first lip to make sealing contact with said bore, a circumferential rib on said valve spool a spaced distance from said first lip to make sealing contact with said bore, the portion of said valve spool intermediate the ends being spaced away from the walls of said bore, an actuator rod connecting said valve spool to the other side of said tube, a passage extending through said valve spool connecting said chamber to the interior of said tube, a plurality of ports opening into said chamber at spaced distances along said bore, the axial length of each of said port openings being less than the spacing between said first lip and said rib on said valve spool, and a bleed passage connecting said chamber to the atmosphere.

11. An actuator comprising a body, a cylinder bore in one end of said body, a piston slidable in said cylinder bore, a valve portion on said body, spring means biasing said piston away from said valve portion, said valve portion having a valve bore therein opening into said cylinder bore, said valve bore being closed at the other end, a valve member slidable in said valve bore, said valve member making sealing contact with the walls of said valve bore to define a chamber between said valve member and said closed end, means connecting said valve member to said piston, passage means connecting said chamber to said cylinder bore, a plurality of ports opening into said chamber at spaced distances along said valve bore, and a bleed passage connecting said chamber to the atmosphere.

12. An actuator comprising a body, a cylinder bore in one end of said body, a piston slidable in said cylinder bore, a valve portion on said body, spring means biasing said piston away from said valve portion, said valve portion having a valve bore therein opening into said cylinder bore, said valve bore being closed at the other end, a resilient valve spool slidable in said valve bore, said valve spool having a lip portion on the end thereof adjacent said closed end to make sealing contact with the walls of said valve bore to define a chamber therein, said valve spool having a lip at the end opposite said first lip to make sealing contact with said valve bore, the portion of said valve spool intermediate the ends being spaced away from the walls of said valve bore, means connecting said valve spool to said piston, passage means connecting said chamber to the interior of said cylinder bore, a plurality of ports opening into said chamber at spaced distances along said valve bore, and a bleed passage connecting said chamber to the atmosphere.

13. An actuator comprising a body, a cylinder bore in one end of said body, a piston slidable in said cylinder bore, a valve portion on said body, spring means biasing said piston away from said valve portion, said valve portion having an axial valve bore therein opening into said cylinder bore, said valve bore being closed at the other end, a resilient valve spool slidable in said valve bore, said valve spool having a flared lip at one end adjacent said closed end of said valve bore and adapted to make sealing contact with the walls of said valve bore to define a chamber therein, a lip on the end of said valve spool opposite said first lip to make sealing contact with said valve bore, a circumferential rib on said valve spool a spaced distance from said first lip to make sealing contact with said valve bore, the portion of said valve spool intermediate the ends being spaced away from the walls of said valve bore, an actuator rod connecting said valve spool to said piston, a passage extending through said valve spool connecting said chamber to the interior of said cylinder bore, a plurality of ports opening into said chamber at spaced distances along said valve bore, the axial length of each of said port openings being less than the spacing between said first lip and said rib on said valve spool, and a bleed passage connecting said chamber to the atmosphere.

References Cited in the file of this patent

UNITED STATES PATENTS

| | | |
|---|---|---|
| 1,484,030 | Kitchen | Feb. 19, 1924 |
| 1,878,944 | Lombard | Sept. 20, 1932 |
| 2,373,272 | Stelzer | Apr. 10, 1945 |
| 2,895,455 | Clowes | July 21, 1959 |
| 2,905,199 | Cook | Sept. 22, 1959 |